(12) United States Patent
Oh et al.

(10) Patent No.: US 12,486,480 B2
(45) Date of Patent: Dec. 2, 2025

(54) LACQUER FOR TREATING 3D PRINTING-CREATED PRINTED MATTER

(71) Applicant: LUVANTIX ADM., CO. LTD, Daejeon (KR)

(72) Inventors: Jung Hyun Oh, Daejeon (KR); Eun Jeong Hahm, Seoul (KR)

(73) Assignee: LUVANTIX ADM., CO. LTD, Yuseong-gu (KR)

( * ) Notice: Subject to any disclaimer, the term of this patent is extended or adjusted under 35 U.S.C. 154(b) by 244 days.

(21) Appl. No.: 18/452,865

(22) Filed: Aug. 21, 2023

(65) Prior Publication Data
US 2024/0209292 A1   Jun. 27, 2024

(30) Foreign Application Priority Data

Dec. 12, 2022   (KR) .................. 10-2022-0172912

(51) Int. Cl.
| | |
|---|---|
| *C11D 7/00* | (2006.01) |
| *A61C 7/08* | (2006.01) |
| *C11D 7/26* | (2006.01) |
| *C11D 7/30* | (2006.01) |
| *C11D 7/50* | (2006.01) |

(52) U.S. Cl.
CPC .............. *C11D 7/5018* (2013.01); *A61C 7/08* (2013.01); *C11D 7/261* (2013.01); *C11D 7/266* (2013.01); *C11D 7/30* (2013.01); *C11D 2111/18* (2024.01)

(58) Field of Classification Search
CPC ....... C11D 7/5018; C11D 7/261; C11D 7/266; C11D 7/30; C11D 2111/18; C11D 7/24; C11D 7/28; C11D 3/3765; A61C 7/08; C09D 133/16; C09D 7/20; B33Y 10/00; B33Y 40/20; B33Y 80/00; B29C 64/35; B29C 2071/0045
USPC ........................................................ 510/161
See application file for complete search history.

(56) References Cited

FOREIGN PATENT DOCUMENTS

| | | | | |
|---|---|---|---|---|
| CN | 105922750 A | * | 9/2016 | ............ B41J 11/002 |
| CN | 107031267 A | * | 8/2017 | ............ C09D 201/00 |
| JP | 2022544012 A | * | 10/2022 | ............ C09D 11/107 |

OTHER PUBLICATIONS

STIC Search Report dated Aug. 6, 2025.*

* cited by examiner

*Primary Examiner* — Eisa B Elhilo
(74) *Attorney, Agent, or Firm* — Christensen O'Connor Johnson Kindness PLLC

(57) ABSTRACT

Proposed is a lacquer for treating a 3D printing-created printed matter that is configured to contain a perfluorinated acrylic resin having a relatively high surface hardness and excellent water resistance and contamination resistance, as well as an excellent force of adhesion to a printing resin making up a 3D printed matter. While the 3D printed matter that is printed through a photocuring-type 3D printer is cleaned and rinsed, an uncured resin remaining on the 3D printed matter is removed, and at the same time, a protective film layer is formed on a surface of the 3D printed matter by being coated thereon. As a result, the surface of the 3D printed matter is protected from damage during a post curing process. Furthermore, the 3D printed matter, which is to be manufactured, is also effectively safeguarded against quality degradation that is caused by contamination through the surface thereof and subsequent discoloration.

16 Claims, No Drawings

LACQUER FOR TREATING 3D PRINTING-CREATED PRINTED MATTER

TECHNICAL FIELD

The present invention relates to a lacquer for treating a 3D printing-created printed matter and, more specifically, to a lacquer for treating a 3D printing-created printed matter, the lacquer being capable of removing an uncured printing resin remaining on a 3D printed matter and at the same time forming a protective film on a surface of the 3D printed matter by being coated thereon. To this end, this lacquer is used when performing a head end process of cleaning and rinsing a surface of the 3D printed matter that is output, before performing a post curing process on the 3D matter that is printed through the photocuring-type 3D printer. As a result, the surface of the 3D printed matter is protected from damage during the post curing process. Furthermore, the 3D printed matter, which is to be manufactured, is also effectively safeguarded against quality degradation caused by contamination through the surface thereof and subsequent discoloration.

BACKGROUND ART

Among 3D printing technologies that have been recently widely used in various fields of technologies, photocuring-based 3D printing is a technique that prints a three-dimensional structure by selectively emitting light to photocuring resin (a resin composition) in liquid. Depending on types of light emitted to the photocuring resin, these techniques are categorized into liquid crystal display (LCD) emission techniques, digital light processing (DLP) techniques, and laser emission techniques.

However, a 3D matter that is printed through photocuring in this manner has to undergo processes of cleaning and drying the 3D printed matter, which is output through 3D printing, because uncured resin in liquid remains on a surface of the 3D printed matter. Furthermore, in most cases, an additional post curing process is necessarily required because normally, the 3D printed matter that is output is also not in a completely cured state.

Therefore, in the related art, in order to remove the remaining uncured resin on the surface of the 3D material that is printed through 3D printing, the 3D printed material is cleaned in a cleaning tank filled with a solvent, such as alcohol, and then the resin or solvent on the 3D printed material surface is removed and dried using an air gun. Thereafter, the 3D printed matter is fully dried inside during the post curing process of reemitting light to the dried 3D printed matter using a post curing device.

However, while the 3D printed matter is cleaned using the solvent in this manner, the resin on the surface of the 3D printed matter that is not yet fully cured is eroded by the solvent, thus the surface of the 3D printed matter becomes coarse and has an irregular roughness. As a result, a phenomenon occurs where the 3D printed matter appears haze due to a decrease in transparency thereof. When this phenomenon occurs particularly to a transparent orthodontic appliance for dental treatment that is to be manufactured through 3D printing, the haze exterior appearance of the transparent orthodontic appliance becomes a factor that causes a significant decrease in the marketability thereof.

In addition, in a normal 3D printing, light is emitted at a precise 2D scale with considerable speed. Thus, in most cases, energy of light that is emitted using an LCD, DLP, or laser is not sufficient to fully (100%) a cure photocuring-type resin. Therefore, usually, only 50% to 60% of the resin making up the 3D printed matter is fully cured immediately after 3D printing is performed. As described above, the 3D printed matter is vulnerable to cleaning that uses a solvent. Furthermore, the post curing that uses the post curing device having a sufficient amount of light is necessarily required in order for the 3D printed matter to have perfect physical properties as designed.

However, while this post curing process is performed, there occurs a problem in that physical properties of the surface of the 3D printed matter are imperfect due to air-contained oxygen and moisture. In other words, air-contained oxygen can inactivate a radical that is generated by a photoinitiator in the 3D printed matter by the generated radical. Similarly, air-contained moisture can inactivate anions that are generated by reacting with anions generated by the photoinitiator in the 3D printed matter. Accordingly, in a case where the post curing process is performed on the 3D printed matter in an air-exposed state, regardless of an amount of light provided by the post curing system, due to influence of air-contained oxygen or moisture, curing is not fully performed up to 10 to 20 μm deep into the surface of the 3D printed matter that makes up the outermost of the 3D printed matter. As a result, a partially uncured portion remains.

This remaining uncured portion of the surface of the 3D printed matter causes the 3D printed matter to be defective due to its weakened physical properties. Particularly when using this 3D printing technology to print the transparent orthodontic appliance for dental treatment, a surface of the orthodontic appliance may be susceptible to damage during usage, leading to a decrease in transparency and thus a decrease in exterior appearance quality. Furthermore, there occurs a problem in that the surface of the orthodontic appliance is damaged when chewing on food or the like, leading to the occurrence of discoloration and the creation of an environment where bacteria breed.

Accordingly, in recent years, as disclosed in Korean Patent No. 10-227347 and other patent documents, various attempts have been made in order to find a solution to the above-mentioned problems. As a solution to the problems, the post curing process is performed in a state where a printed matter is immersed in water, glycerol, or oil. As another solution, the post curing process is performed after an environment of inert gas, such as nitrogen, is created inside the post curing device. However, these approaches have limitations in that a relatively complex structure of a device for a post curing process is required, leading to an increase in manufacturing costs and processing time and in that it is difficult to fundamentally prevent a surface of the printed matter from being damaged during the above-described initial cleaning process that uses a solvent.

RELATED ART DOCUMENT

Patent Document

Korean Patent No. 10-2273407(registered on Jun. 30, 2021), entitled "Post-curing method of 3D printer output and transparent orthodontic device manufactured by the method"

DISCLOSURE

Technical Problem

In order to prevent a surface of a 3D printed matter from being damaged during the above-described processes of cleaning the 3D printed matter in the related art, an object of the present invention is to provide a lacquer for treating a 3D printing-created printed matter. The lacquer is capable of removing an uncured printing resin remaining on a surface of a 3D printed matter and, at the same time, forming a protective film on the surface of the 3D printed matter by being coated thereon, during a process of cleaning the surface of the 3D printed matter. As a result, the surface of the 3D printed matter is protected from damage during a subsequent post curing process. Furthermore, the 3D printed matter, which is to be manufactured, is also effectively safeguarded against quality degradation caused by contamination through the surface thereof and subsequent discoloration.

Technical Solution

In order to achieve the above-mentioned object, according to an aspect of the present invention, there is provided a lacquer for treating a 3D printing-created printed matter, the lacquer containing a solvent for cleaning a surface of a 3D printed matter and a perfluorinated acrylic resin that is coated, as a protective film, on the surface of the 3D printed matter. Through the lacquer, while the surface of the 3D printed matter is cleaned and rinsed, an uncured printing resin remaining on the surface of the 3D printed matter is removed, and, at the same time, a protective film is formed on the surface of the 3D printed matter that is cleaned. As a result, the surface of the 3D printed matter, which is to be manufactured after undergoing a subsequent post curing process, is kept transparent and smooth. Furthermore, contamination and discoloration can be effectively prevented during usage, and the durability of the 3D printed matter can be improved.

Advantageous Effects

A lacquer for treating a 3D printing-created printed matter according to the present invention is configured to contain a perfluorinated acrylic resin having a relatively high surface hardness, and excellent water resistance and contamination resistance, as well as an excellent force of adhesion to a printing resin making up a 3D printed matter. While the 3D printed matter is cleaned and rinsed, the perfluorinated acrylic resin is coated, as a protective film, on a surface of the 3D printed matter. The surface of the 3D printed matter, which is to be manufactured, can be kept transparent and smooth. Furthermore, the durability of the 3D printed matter can be improved.

In addition, during a post curing, the coating on the surface of the 3D printed matter fundamentally blocks oxygen or moisture from penetrating into the 3D printed matter. As a result, the lacquer for treating a 3D printing-created printed matter supports the post curing process in a facilitated manner under a general atmospheric environment without requiring a separate special operating environment.

In addition, a composition of a perfluorinated solvent and a general solvent that make up the lacquer for treating a 3D printing-created printed matter according to the present invention also provides excellent cleanability for perfluorinated resin, as well as for a general 3D printing resin. For this reason, the lacquer for treating a 3D printing-created printed matter can be widely used for the 3D printed matter that is manufactured of various types of resin. Furthermore, an uncured printing resin remaining on the surface of the 3D printed matter is cleaned, and, at the same time, coating is provided on the surface of the 3D printed matter. As a result, there is provided an advantage in that the 3D printed matter can be immediately dried without being separately rinsed after being cleaned and the post curing process can be performed.

Best Mode

Specific composition components making up each of the lacquers for treating a 3D printing-created printed matter according to several embodiments of the present invention will be described in more detail below.

1) Fluorinated Acrylic Resin

As described above, the lacquer for treating a 3D printing-created printed matter according to the present invention is configured to contain a perfluorinated acrylic resin. The perfluorinated acrylic resin is coated on a surface of a 3D printed matter, which is susceptible to damage during a cleaning process, with an excellent force of adhesion to a printing resin making up the 3D printed matter. As a result, the perfluorinated acrylic resin keeps the surface of the 3D printed matter transparent by preventing haze caused by the damage to the surface of the 3D printed matter that occurs during the cleaning process. Simultaneously, the perfluorinated acrylic resin keeps physical and optical properties of the 3D printed matter unchanged by blocking moisture or oxygen, which degrades the physical and optical properties of the printed matter, from penetrating into the 3D printed matter during a post curing process that follows or while in use after manufacturing. In this case, a structural formula for the perfluorinated acrylic resin contained in the lacquer for treating a 3D printing-created printed matter according to the present invention is expressed as shown in the following [chemical formula 1].

[Chemical Formula 1]

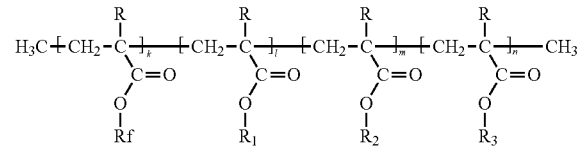

where K, I, m, and n are constants, k has a value ranging from 1 to 10,000, and l, m, and n each have a value ranging from 0 to 10,000, (except when l, m, and n all have a value of 0), where R is —H, —CH$_3$, or a hydrocarbon group that has a carbon number of 20 or less, where R$_f$ is a perfluorinated carbon group, containing a perfluorinated carbon (—CF$_2$— or —CF$_3$), that has a carbon number ranging from 3 to 12, and where R$_1$, R$_2$, and R$_3$ are hydrocarbon groups, each with a hydrogen or carbon number ranging from 1 to 20, and have structures, in each of which one or more carbon molecules are substituted by oxygen (O), nitrogen (N), or sulfur (S).

Characteristics of each reactive group making up the perfluorinated acrylic resin will be described in more detail below.

①) R$_f$: R$_f$ for Providing Water Resistance, Contamination Resistance, and Solubility of the Perfluorinated Acrylic Resin An R$_f$ reactive group may have a linear structure, a branched structure, a cyclo structure, or an acyclic structure and has a structure which has a carbon number ranging from 3 to 12, with one or several parts or all parts of the structure being perfluorinated. Examples of the $R_f$ reactive group include Pentafluorobenzyl [—CH$_2$-cyclo(C$_6$F$_5$)], Octafluoropentyl [—CH$_2$(CF$_2$)$_4$H], Nonafluorohexyl [—CH$_2$CH$_2$(CF$_2$)$_3$CF$_3$], Heptafluorobutyl [—CH$_2$CF$_2$CF$_2$CF$_3$], Tridecafluoro-n-octyl [—CH$_2$CH$_2$(CF$_2$)$_5$CF$_3$], 2-Perfluorooctyl ethyl [—CH$_2$CH$_2$(CF$_2$)$_7$CF$_3$], 2-Perfluorodecyl ethyl [—CH$_2$CH$_2$(CF$_2$)$_9$CF$_3$], 3-(Perfluorobutyl)propyl [—CH$_2$(CH$_2$)$_2$(CF$_2$)$_3$CF$_3$], 3-(Perfluorobutyl)propyl [—CH$_2$(CH$_2$)$_2$(CF$_2$)$_5$CF$_3$], 3-Perfluorooctyl propyl [—CH$_2$(CH$_2$)$_2$(CF$_2$)$_7$CF$_3$], Trifluoroethyl [—CH$_2$CF$_3$], Pentafluorophenyl [-cyclo(C$_6$F$_5$)], Tetrafluoropropyl [—CH$_2$CF$_2$CF$_2$H], Hexafluorobutyl [—CH$_2$CF$_2$CHFCF$_3$], Pentafluoropropyl [—CH$_2$CF$_2$CF$_3$], Hexafluoroisopropyl [—C(CF$_3$)$_2$H], Dodecafluoroheptyl [—CH$_2$(CF$_2$)$_5$CHF$_2$] and the like.

The role of the $R_f$ reactive group is to provide solubility for a perfluorinated solvent making up the lacquer for treating a 3D printing-created printed matter according to the present invention, to increase water resistance of the surface of the 3D printed matter through a high water repellent force of a fluorine component, and also to prevent surface contamination and discoloration through low surface tension. In addition, in a case where a product, such as an orthodontic appliance for dental treatment, is used in direct contact with the human body, the $R_f$ reactive group can enhance the non-toxicity of such a product to the human body.

② $R_1$, $R_2$, and $R_3$: Hydrocarbon Groups for Improving Physical Properties of the Perfluorinated Acrylic Resins $R_1$, $R_2$, and $R_3$ reactive groups can have a linear structure, a branched structure, a cyclo structure, or an acyclic structure. The $R_1$, $R_2$, and $R_3$ reactive groups are hydrocarbon groups, each with hydrogen alone or a carbon number ranging from 1 to 20, and have structures in which one or more carbon molecules are substituted by oxygen (O), nitrogen (N), or sulfur (S). Examples of the $R_1$, $R_2$, and $R_3$ reactive groups include Hydrogen [—H], Methyl [—CH$_3$], Ethyl [—CH$_2$CH$_3$], isopropyl [—CH(CH$_3$)$_2$], n-Butyl [—(n)C$_4$H$_9$], Ethylhexyl [—CH$_2$CH(C$_2$H$_5$)C$_4$H$_9$], n-Hexyl [—(n)C$_6$H$_{13}$], Lauryl [—C$_{12}$H$_{25}$], Hydroxyethyl [—CH$_2$CH$_2$—OH], Hydroxypropyl [—CH$_2$CH(OH)CH$_3$], Cyclic trimethylolpropane, Phenoxy benzyl, trimethyl cyclohexyl, Isobornyl, o-Phenylphenol EO, Tert-butylcyclohexyl, Benzyl, Biphenylmethyl, Phenol EO, Phenol (EO)$_2$, Phenol (EO)$_4$, Tetrahydrofurfuryl, Nonyl phenol (EO)$_2$, Nonyl phenol (EO)$_4$, Nonyl phenol (EO)$_8$, Stearyl, and the like.

In the case of methyl [—CH$_3$], ethyl [—CH$_2$CH$_3$], isopropyl [—CH(CH$_3$)$_2$], n-butyl [—(n)C$_4$H$_9$], ethylhexyl [—CH$_2$CH(C$_2$H$_5$)C$_4$H$_9$], and the like, the roles of the $R_1$, $R_2$, and $R_3$ hydrocarbon groups are to increase solubility for a general solvent that is contained in a solvent making up the lacquer for treating a 3D printing-created printed matter according to the present invention. On the other hand, in the case of Hydroxyethyl [—CH$_2$CH$_2$—OH], Hydroxypropyl [—CH$_2$CH(OH)CH$_3$], Isobornyl, and the like, the roles of the $R_1$, $R_2$, and $R_3$ hydrocarbon groups are to increase a force of adhesion to a 3D printing resin making up the printed matter. In contrast, in the case of Hydrogen [—H], Methyl [—CH$_3$], and the like, the roles of the $R_1$, $R_2$, and $R_3$ hydrocarbon groups are to increase a glass transition temperature (Tg) of the perfluorinated acrylic resin that is coated on the 3D printed matter, thereby increasing the surface hardness of the 3D printed matter. As a result, the $R_1$, $R_2$, and $R_3$ hydrocarbon groups contribute to improving various physical properties of the perfluorinated acrylic resin according to the present invention, which is coated on the surface of the 3D printed matter, such as preventing damage to the surface of the 3D printed matter and also improving contamination resistance of the 3D printed matter while the 3D printed matter is in use.

The above-described perfluorinated acrylic resin can be manufactured by mixing various perfluorinated monomers and/or general monomers that support each of the above-mentioned physical properties and then by performing thermal polymerization reaction using a thermal initiator. At this point, the monomers that are to be mixed may be appropriately selected and used according to the physical properties of the perfluorinated acrylic resin that is to be manufactured.

In particular, it is preferred that the perfluorinated acrylic resin that finds application in transparent orthodontic appliances for dental treatment has the following physical properties.

1) Excellent solubility for a non-toxic and non-flammable fluorine solvent mixture
2) Excellent force of adhesion to the 3D matter that is printed using a general 3D printing resin
3) Surface hardness of H or higher on the hardness scale for preventing the damage to the surface of the 3D printed matter
4) Excellent water resistance for protecting the 3D printed matter with a thickness of 50 µm or less from hot water at a temperature of 37° C.
5) Excellent contamination resistance to a foodstuff, such as coffee, tea, and juice
6) Properties of being non-toxic and harmless to the human body even when the orthodontic appliance is worn for a long time 2) Solvent for Cleaning the Surface of the 3D Printed Matter As described above, the lacquer for treating a 3D printing-created printed matter according to the present invention contains the perfluorinated acrylic resin, which is coated on the surface of the 3D printed matter during the cleaning process when cleaning the surface of the 3D printed matter. For this reason, the solvent making up the lacquer for treating a 3D printing-created printed matter according to the present invention needs to provide sufficient solubility for the perfluorinated acrylic resin that is to be contained in the lacquer, as well as cleanability for a general 3D printing resin making up the 3D printed matter.

Thus, according to the present invention, a mixture of a perfluorinated solvent and a general solvent is used to prepare the solvent that is to be contained in the lacquer for treating a 3D printing-created printed matter. Typically, the perfluorinated solvents that are commonly widely used include hydrofluoroethers (HFEs), hydrofluorocarbons, (HFCs), hydrohalofluoroethers (HHFEs), hydrochlorofluorocarbons (HCFCs), and the like.

In addition, this general solvent refers to a solvent that is used to clean a general 3D printed matter. In most cases, an alcohol, such as ethanol or isopropanol, that is known for its fast drying speed, or an aliphatic saturated hydrocarbon, such as isoparaffin, may be used as a solvent used for cleaning the 3D printed matter. However, the 3D printed matter is not necessarily limited to the alcohol and the aliphatic saturated hydrocarbon. Of course, various general solvents that can clean the 3D printing resin may be used.

According to the present invention, a perfluorinated solvent of 60 to 95 wt % and a general solvent of 5 to 40 wt % are mixed to prepare the solvent that is to be contained in the lacquer for treating a 3D printing-created printed matter. The reason for this is to satisfy various physical properties required of the solvent, described below, according to the present invention.

In other words, the solvent that is to be contained in the lacquer for treating a 3D printing-created printed matter according to the present invention has to provide excellent solubility (cleanability) for a general 3D printing resin making up the 3D printed matter, as well as excellent solubility for the perfluorinated acrylic resin described above. Furthermore, this solvent, like IPA or an alcohol solvent that is used in the related art, has to evaporate at a fast speed in such a manner as to achieve full drying within 10 minutes in the atmosphere. For widespread usage in a general hospital, a dental laboratory, or the like, it is more preferable for this solvent to be non-explosive during storage and transportation, as well as being non-toxic and harmless to the human body.

In order to meet the above-mentioned conditions, several characteristics are required of the perfluorinated solvent that is to be contained in the lacquer for treating a 3D printing-created printed matter according to the present invention has required. First of all, the perfluorinated solvent that is used according to the present invention has to provide excellent cleanability through a low surface tension of 5 to 20 dynes/cm. In addition, it is preferred for this perfluorinated solvent to have a boiling point of 120° C. or below, enabling fast drying in the atmosphere, and to be non-flammable with a flash point of 60° C. or higher, reducing the risk of explosion during transportation, storage, and usage.

The perfluorinated solvent that is to be used in the lacquer for treating a 3D printing-created printed matter according to the present invention, which satisfies the above-described characteristics, has the following chemical structure.

i) $C_nH_mF_{2n+2-m}$ (Chemical Structure I)

In the chemical structure I, n is an integer ranging from 3 to 20 and m is an integer that is 1 or greater, and one or more —$CH_2$— molecules are substituted by oxygen (O) or nitrogen (N). Examples of this chemical structure are as follows, but this chemical structure is not necessarily limited thereto: $CF_3CH_2CF_2H$, $CF_2HCF_2CH_2F$, $CH_2FCF_2CFH_2$, $CF_2HCH_2CFH_2$, $CFHCFHCF_2H$, $CF_3CFHCF_3$, $CF_3CH_2CF_3$, $CHF_2(CF_2)_2CF_2H$, $CF_3CF_2CH_2CH_2F$, $CF_3CH_2CF_2CH_2F$, $CH_3CHFCF_2CF_3$, $CF_3CH_2CF_2CF_3$, $CH_2FCF_2CF_2CH_2F$, $CF_3CH_2CF_2CH_3$, $CHF_2CH(CF_3)CF_3$, $CHF(CF_3)CF_2CF_3$, $CF_3CH_2CHFCF_2CF_3$, $CF_3CHFCH_2CF_2CF_3$, $CF_3CH_2CF_2CH_2CF_3$, $CF_3CHFCHFCF_2CF_3$, $CF_3CH_2CH_2CF_2CF_3$, $CH_3CHFCF_2CF_2CF_3$, $CF_3CF_2CF_2CH_2CH_3$, $CH_3CF_2CF_2CF_2CF_3$, $CF_3CH_2CHFCH_2CF_3$, $CH_2FCF_2CF_2CF_2CF_3$, $CHF_2CF_2CF_2CF_2CF_3$, $CH_3CF(CHFCHF_2)CF_3$, $CH_3CH(CF_2CF_3)CF_3$, $CHF_2CH(CHF_2)CF_2CF_3$, $CHF_2CF(CHF_2)CF_2CF_3$, $CHF_2CF_2CF(CF_3)_2$, $CHF_2(CF_2)_4CF_2H$, $(CF_3CH_2)_2CHCF_3$, $CH_3CHFCF_3CHFCHFCF_3$, $HCF_2CHFCF_2CF_2CHFCF_2H$, $H_2CFCF_2CF_2CF_2CF_2H$, $CHF_2CF_2CF_2CF_2CF_2CHF_2$, $CH_3CF(CF_2H)CHFCHFCF_3$, $CH_3CF(CF_3)CHFCHFCF_3$, $CH_3CF(CF_3)CF_2CF_2CF_3$, $CHFCF_2CH(CF_3)CF_2CF_3$, $CHF_2CF_2CF(CF_3)CF_2CF_3$, $CH_3CHFCH_2CF_2CHFCF_2CF_3$, $CH_3(CF_2)_5CH_3$, $CH_3CH_2(CF_2)_4CF_3$, $CF_3CH_2CH_2(CF_2)_3CF_3$, $CH_2FCF_2CHF(CF_2)_3CF_3$, $CF_3CF_2CF_2CHFCHFCF_2CF_3$, $CF_3CF_2CF_2CHFCF_2CF_2CF_3$, $CH_3CH(CF_3)CF_2CF_2CH_3$, $CH_3CF(CF_3)CH_2CFHCF_2CF_3$, $CH_3CF(CF_2CF_3)CHFCF_2CF_3$, $CH_3CH_2CH(CF_3)CF_2CF_2CF_3$, $CHF_2CF(CF_3)(CF_2)_3CH_2F$, $CH_3CF_2C(CF_3)_2CF_2CH_3$, $CHF_2CF(CF_3)(CF_2)_3CF_3$, $CH_3CH_2CH_2CH_2CF_2CF_2CF_2CF_3$, $CH_3(CF_2)_6CH_3$, $CHF_2CF(CF_3)(CF_2)_4CHF_2$, $CHF_2CF(CF_3)(CF_2)_4CHF_2$, $CH_3CH_2CH(CF_3)CF_2CF_2CF_2CF_3$, $CH_3CF(CF_2CF_3)$ $CHFCF_2CF_3$, $CH_3CH_2CH_2CHFC(CF_3)_2CF_3$, $CH_3C$ $(CF_3)_2CF_2CF_2CH_3$, $CH_3CH_2CH_2CF(CF_3)CF(CF_3)_2$, and $CH_2FCF_2CF_2CHF(CF_2)_3CF_3$.

The perfluorinated solvents, each with one of the above-mentioned structures, for sale in the market include perfluorinated solvents that are sold under the trademark VERTREL™ of DuPont de Nemours, Inc., in USA, perfluorinated solvents that are sold under the trademark ZEORORA-H™ of ZEON CORPORATION, in Japan, HFC manufactured by Allied Signal Chemical in USA, and the like.

ii) $(R_1—O)_n—R_2$ (Chemical Structure II)

In the Chemical structure II, n is an integer ranging from 1 to 3, one of $R_1$ and $R_2$ contains one or more fluorine atoms, $R_1$ and $R_2$ are carbon compounds, each with a linear structure, a branched structure, a cyclo structure or an acyclic structure, and $R_1$ and $R_2$ has a structure containing one or more nitrogen or oxygen atoms. In some cases, the $R_1$ and $R_2$ may each contain one or more chlorine (Cl) atoms.

iii) $R_f—O—R$ (Chemical Structure III)

In the chemical structure III, $R_f$ and R correspond to $R_1$ and $R_2$, respectively, in the above-mentioned chemical structure II, and $R_f$ contains one or more fluorine atoms, while R has a structure that contains no fluorine. The characteristics of this structure are that a part thereof that contains fluoride and a part thereof that does not contain fluoride are separated through an ether structure (—O—), thereby increasing miscibility with a general solvent and the 3D printing resin.

R has an acyclic branched structure or is composed of an alkyl group not containing fluoride, such as methyl, ethyl, n-propyl, iso-propyl, n-butyl, iso-butyl, and t-butyl. $R_f$ has a linear structure, a branched structure, a cyclic structure, or an acyclic alkyl structure. $R_f$ can have a structure, such as n-$C_4F_9$—, i-$C_4F$—, i-$C_3F_7$, (n-$C_3F_7$)CF—, or cyclo-$C_6F_{11}$—, that has a perfluorinated carbon, with a carbon number ranging from 3 to 14, and that contains one or more oxygen or nitrogen atoms.

Examples of this chemical structure are as follows, but this chemical structure is not necessarily limited thereto. "F" in a cyclic structure refers to a perfluorinated structure.

$(C_2F_5)_2NCF_2CF_2OCH_3$
$C_2F_5CF(OCH_3)CF(CF_3)_2$
$(CF_3)_2N(CF_2)_3OCH_3$
$(CF_3)_2N(CF_2)_2OC_2H_5$
$(C_2F_5)_2NCF_2CF_2OCH_3$
$(CF_3)_2CFOCH_3$
$(CF_3)_2C—OCH_3$
$(CF_3)_3C—OC_2H_5$
$C_5F_{11}OC_2H_5$
$CF_3OC_2F_4OC_2H_5$

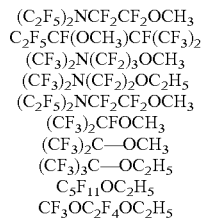

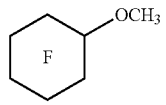

n-$C_4F_9OC_2H_5$
n-$C_3F_7OCH_3$

-continued n-C$_4$F$_9$OCH$_3$

CF$_3$CFCF$_2$OCH$_3$
|
CF$_3$

| | | |
|---|---|---|
| HCF$_2$OCF$_2$OCF$_2$H | HCF$_2$OCF$_2$OC$_2$F$_4$OCF$_2$H | C$_3$F$_7$OCH$_2$F |
| HCF$_2$OC$_2$F$_4$OCF$_2$H | HCF$_2$OCF$_2$OCF$_2$OCF$_2$H | HCF$_2$OC$_2$F$_4$OC$_2$F$_4$OCF$_2$H |
| HC$_3$F$_6$OCH$_3$ | HC$_3$F$_6$OC$_3$F$_6$H | C$_4$F$_9$OC$_2$F$_4$H |
| C$_5$F$_{11}$OC$_2$F$_4$H | C$_6$F$_{13}$OCF$_2$H | and |
| C$_3$F$_7$O[CF(CF$_3$)CF$_2$O]$_p$CF(CF$_3$)H, wherein p = 0 to 1 | | |

-continued

CF$_3$CFCF$_2$OC$_2$H$_5$
|
CF$_3$

C$_3$F$_7$CF(OCH$_3$)CF(CF$_3$)$_2$
C$_2$F$_5$CF(OC$_2$H$_5$)CF(CF$_3$)$_2$
CF$_3$CF(OC$_2$H$_5$)CF(CF$_3$)$_2$

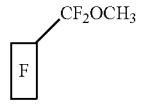

CF$_3$CF(OCH$_3$)CF(CF$_3$)$_2$
nC$_3$F$_7$OC$_2$H$_5$

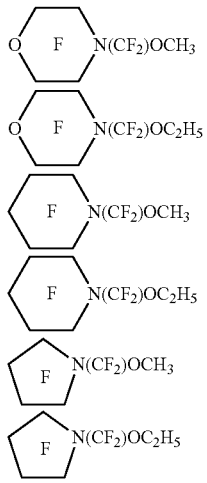

Among the perfluorinated solvents, each with one of the above-mentioned structures, a perfluorinated solvent having a structure, such as n-C$_3$F$_7$OCH$_3$, (CF$_3$)$_2$CFOCH$_3$, n-C$_4$F$_9$OCH$_3$, (CF$_3$)$_2$CFCF$_2$OCH$_3$, n-C$_3$F$_7$OC$_2$H$_6$, n-C$_4$F$_9$OC$_2$H$_5$, (CF$_3$)$_2$CFCF$_2$OCH$_5$, (CF$_3$)$_3$COCH$_3$, or (CF$_3$)$_3$COC$_2$H$_5$ is more effective. Examples of this perfluorinated solvent for sale include SV-100 manufactured by Solvay S.A, NOVEC, HFE-7100, and HFE-7200 manufactured by 3M Company, and the like.

iv) X—[R$_f^a$—O]$_y$R$^b$H    (Chemical Structure IV)

In the chemical structure IV, X is a perfluoroalkyl that has fluorine and hydrocarbon with a hydrogen or carbon number ranging from 1 to 3, R$_f^a$ is —CF$_2$—, C$_2$F$_4$—, or C$_3$F$_6$—, y is an integer ranging from 1 to 7 (preferably from 1 to 3), and R$^b$ is hydrocarbon with a carbon number ranging from 1 to 3, preferably perfluorinated hydrocarbon.

Examples of this chemical structure are as follows, but this chemical structure is not necessarily limited thereto.

Among the perfluorinated solvents, each with one of the above-mentioned structures, a perfluorinated solvent having a structure, such as C$_4$F$_9$OC$_2$F$_4$H, C$_6$F$_{13}$OCFH, HC$_3$F$_6$OC$_3$F$_6$H, C$_3$F$_7$OCH$_2$F, HCFOCF$_2$OCF$_2$H, HCF$_2$OCF$_2$CF$_2$OCF$_2$H, HC$_3$F$_6$OCH$_3$, or HCF$_2$OCF$_2$OC$_2$F$_4$OCF$_2$H is more effective. Examples of this perfluorinated solvent for sale include GALDEN manufactured by Solvay S.A, and the like.

v) R$_f$—O—C$_a$H$_b$F$_c$X$_d$    (Chemical Structure V)

In the chemical structure V, R$_f$ is a perfluoroalkyl that has a carbon number ranging from 3 to 6 and selectively one oxygen (O) or nitrogen (N) atom, a is an integer ranging from 1 to 6, b is an integer greater than or equal to 1, c is an integer ranging from 0 to 2, and d is an integer greater than or equal to 1. Furthermore, b+c+d=2a+1, and X is one of bromine, iodine, and chlorine.

Examples of this chemical structure are as follows, but this chemical structure is not necessarily limited thereto:
cyclo-C$_6$F$_{11}$OCHCl, (CF$_3$)$_2$CFOCHCl$_2$, (CF$_3$)$_2$CFOCH$_2$Cl, CF$_3$CF$_2$CF$_2$OCH$_2$Cl, CF$_3$CF$_2$CF$_2$OCHCl$_2$, (CF$_3$)$_2$CFCF$_2$OCHCl$_2$, (CF$_3$)$_2$CFCF$_2$OCH$_2$Cl, CF$_3$CF$_2$CF$_2$CF$_2$OCHCl$_2$, CF$_3$CF$_2$CF$_2$CF$_2$OCH$_2$Cl, (CF$_3$)$_2$CFCF$_2$OCHClCH$_3$, CF$_3$CF$_2$CF$_2$CF$_2$OCHClCH$_3$, (CF$_3$)$_2$CFCF(C$_2$F$_5$)OCH$_2$Cl, (CF$_3$)$_2$CFCF$_2$OCH$_2$Br, and CF$_3$CF$_2$CF$_2$OCH$_2$I.

According to the present invention, as described above, a solvent for a lacquer is formed by mixing a perfluorinated solvent of 60 to 95 wt %, which has the above-mentioned structure, and a general solvent of 5 to 40 wt %. The resulting solvent for the lacquer is mixed with the perfluorinated acrylic resin described above to manufacture the lacquer for treating a 3D printing-created printed matter. At this time, a weight ratio of the perfluorinated acrylic resin contained in the lacquer for treating a 3D printing-created printed matter may be set appropriately according to the specific application and purpose of the lacquer for treating a 3D printing-created printed matter. Usually, it is preferred that a perfluorinated acrylic resin of 20 to 40 wt % and a solvent of 60 to 80 wt % are used to manufacture the lacquer for treating a 3D printing-created printed matter.

Through several implementation examples, the lacquer for treating a 3D printing-created printed matter according to the present invention was manufactured using the above-described compositions. Then various physical property experiments were conducted on the manufactured lacquer for treating a 3D printing-created printed matter. The effects of treating the 3D printing-created printed matter that were achieved by the manufactured lacquer for treating a 3D printing-created printed matter will be described in more detail below.

Implementation Examples: Manufacturing of a Perfluorinated Copolymer of the Perfluorinated Solvent and the Perfluorinated Acrylic Resin Implementation Example 1 (FP01)

1,000 g of SV-100 (having a boiling point of 110° C.) manufactured by Solvay S.A was inserted into a reactor equipped with a condenser and a thermometer, and oxygen in the reactor was removed through nitrogen purging to create a nitrogen atmosphere. Then, the reactor was maintained at a temperature of 100° C. using a heating mantle. A monomer mixture was prepared by mixing 900 g of 2-Perfluorohexyl ethyl methacrylate that was a perfluorinated methacrylic monomer, 80 g of 2-Hydroxyyl methacrylate that was a methacrylic monomer which did not contain fluorine, and 20 g of t-butyl peroxy 2-ethyl hexanoate as a thermal initiator. The resulting monomer mixture was inserted over two hours using a dropping funnel. After the injection, the reactor was maintained at a temperature of 100° C. for 10 hours, and thus, a copolymer of the perfluorinated solvent and the perfluorinated acrylic resin was manufactured.

It was ascertained that the manufactured perfluorinated copolymer was in a fixed phase at room temperature and had a refractive index of 1.375.

Implementation Example 2 (FP02)

1,000 g of SV-100 (having a boiling point of 110° C.) manufactured by Solvay S.A was inserted into the reactor equipped with the condenser and the thermometer, and oxygen in the reactor was removed through the nitrogen purging to create the nitrogen atmosphere. Then, the reactor was maintained at a temperature of 100° C. using the heating mantle. A monomer mixture was prepared by mixing 820 g of 2-Perfluorohexyl ethyl methacrylate that was a perfluorinated methacrylic monomer, 80 g of Isobornyl methacrylate that was a methacrylic monomer which did not contain fluorine, 80 g of Tert-butylcyclohexyl methacrylate, and 20 g of t-butyl peroxy 2-ethyl hexanoate as a thermal initiator. The resulting monomer mixture was inserted over two hours using the dropping funnel. After the injection, the reactor was maintained at a temperature of 100° C. for 10 hours, and thus a copolymer of the perfluorinated solvent and the perfluorinated acrylic resin was manufactured.

Manufacturing Example: Manufacturing of the Lacquer for Treating a 3D Printing-Created Printed Matter Each of ethanol and isopropanol (IPA), which were used as commercially-available general solvents, and ethyl acetate (EA) solvent, was mixed, by 111 g, with each of the copolymers (FP01 and FP02) of the perfluorinated solvent and the perfluorinated acrylic resin, which were manufactured through the above-described implementation examples, so that the perfluorinated solvent and the general solvent were mixed at a weight ratio of 9:1. The lacquer for treating a 3D printing-created printed matter according to the present invention, which contained the perfluorinated acrylic resin, was manufactured as shown in Table 1.

TABLE 1

Composition components of the lacquer for treating a 3D printing-created printed matter according to the manufacturing example

| Lacquer for treating a printed matter | Perfluorinated copolymer | General solvent (10 wt %) |
|---|---|---|
| Manufacturing Example 1 | FP01 | Ethanol |
| Manufacturing Example 2 | FP01 | IPA |
| Manufacturing Example 3 | FP01 | Ethyl acetate |
| Manufacturing Example 4 | FP02 | Ethanol |
| Manufacturing Example 5 | FP02 | IPA |
| Manufacturing Example 6 | FP02 | Ethyl acetate |

Experimental Example: Test of Physical Properties of the Lacquer for Treating a 3D Printing-Created Printed Matter Various physical property tests were conducted on the lacquer for treating a 3D printing-created printed matter according to the present invention, which was manufactured according to the above-described manufacturing examples. The results of the tests are summarized as follows.

TABLE 2

Results of the test of the physical properties of the lacquer for treating a 3D printing-created printed matter according to the present invention

| | Transparency | Drying speed | Surface transparency | Surface strength | Adhesion strength | Water resistance | Contamination resistance |
|---|---|---|---|---|---|---|---|
| Manufacturing Example 1 | Transparent | Excellent | Transparent | 2H | 100/100 | −15% | No discoloration |
| Manufacturing Example 2 | Transparent | Excellent | Transparent | 2H | 100/100 | −15% | No discoloration |
| Manufacturing Example 3 | Transparent | Excellent | Transparent | 2H | 100/100 | −15% | No discoloration |
| Manufacturing Example 4 | Transparent | Excellent | Transparent | 2H | 100/100 | −23% | No discoloration |
| Manufacturing Example 5 | Transparent | Excellent | Transparent | 2H | 100/100 | −23% | No discoloration |
| Manufacturing Example 6 | Transparent | Excellent | Transparent | 2H | 100/100 | −21% | No discoloration |
| Solvent cleaning | — | — | Opaque (Haze) | B | | −90% | Discoloration (brown color |

(1) Transparency of the Lacquer for Treating a 3D Printing-Created Printed Matter According to the above-described processes, the lacquer for treating a 3D printing-created printed matter according to the present invention, containing the perfluorinated acrylic resin, was manufactured by mixing the perfluorinated solvent and the general solvent. The results of checking a liquid-state exterior appearance of the manufactured lacquer showed that the transparency was ensured in all Manufacturing Examples 1 to 6. This suggests that each of the $R_f$ perfluorinated group, which was contained in the perfluorinated acrylic resin, and the $R_1$ to $R_3$ hydrocarbon groups formed a copolymer, together with the perfluorinated solvent, and the general solvent, and thus was evenly mixed.

(2) Drying Speed of the Lacquer for Treating a 3D Printing-Created Printed Matter 30 transparent orthodontic appliances were printed using LuDent OA resin manufactured by 3DMaterials, through a LuDent One LCD 3D printer also manufactured by 3DMaterials. Then, the 3D printed matter that was output was cleaned and rinsed simultaneously using 200 g of the lacquer for treating a 3D printing-created printed matter according to the present invention. Subsequently, the 3D printed matter was dried at a temperature of 25° C. at a humidity of 50% for five minutes in the atmosphere. Thereafter, when a user touches on the surface of the 3D printed matter, if no resin was left on the user's hand, and no fingerprint was not left on the surface thereof, the 3D printed material was determined as "Excellent."

In all Manufacturing Examples 1 to 6, it was ascertained that the drying speed was excellent.

(3) Transparency of the Surface of the 3D Printed Matter after Cleaning 30 transparent orthodontic appliances were printed using LuDent OA resin manufactured by 3DMaterials, through the LuDent One LCD 3D printer also manufactured by 3DMaterials. Then, the 3D printed matter that was output was cleaned and rinsed simultaneously using 200 g of the lacquer for treating a 3D printing-created printed matter according to the present invention. Subsequently, the 3D printed matter was dried at a temperature of 25° C. at a humidity of 50% for five minutes in the atmosphere. Thereafter, the transparency of the surface of the dried 3D printed matter was measured.

The measured transparency of the surface was compared with the transparency of a surface of a commercially-available transparent orthodontic appliance that was manufactured through vacuum molding of a PET sheet. The result of the comparison ascertained that the measured transparency had the same transparency as the surface of the commercially-available transparent orthodontic appliance.

In contrast, the 3D printed matter that was output was cleaned and rinsed using a general solvent in the related art, and then was dried. Thereafter, the transparency of the surface of the 3D printed matter was measured. The result of the measurement ascertained that haze appeared on the surface of the 3D printed matter and that the surface thereof was partly opaque.

(4) Surface Hardness of the 3D Printed Matter after Performing the Post Curing Process 30 transparent orthodontic appliances were printed using LuDent OA resin manufactured by 3DMaterials, through the LuDent One LCD 3D printer also manufactured by 3DMaterials. Then, the 3D printed matter that was output was cleaned and rinsed simultaneously using 200 g of the lacquer for treating a 3D printing-created printed matter according to the present invention. Subsequently, the 3D printed matter was dried at a temperature of 25° C. at a humidity of 50% for five minutes in the atmosphere. Thereafter, the post curing process was performed for two minutes in the atmosphere using a LuDent Cure system manufactured by 3DMaterials.

Likewise, the post curing process was performed on the transparent orthodontic appliance which, under the same conditions, was cleaned and rinsed using a general solvent in the related art and then was dried, for two minutes in the atmosphere using the LuDent Cure system manufactured by 3DMaterials.

Thereafter, the surface hardness of the 3D printed matter was measured using a pencil hardness tester.

As can be ascertained from the results of the measurement, in a case where the transparent orthodontic appliance was cleaned and rinsed using a general solvent in the related art, the surface of the printed matter was not completely cured due to the influence of oxygen (O) contained in the atmosphere, resulting in a soft hardness (B). However, in a case where the transparent orthodontic appliance was cleaned and rinsed through the use of the lacquer for treating 3D printed matter according to the present invention, it was ascertained that oxygen in the atmosphere was blocked due to the perfluorinated acrylic resin coated on the surface and thus that a sufficient surface hardness (2H) was ensured.

(5) Strength of Adhesion to the Surface of the 3D Printed Matter

A specimen with a size of 5 mm (thickness)×100 mm×100 mm for adhesion testing was printed and output using LuDent OA resin manufactured by 3DMaterials through the LuDent One LCD 3D printer also manufactured by 3DMaterials. The printed specimen was cleaned and rinsed simultaneously using 200 g of the lacquer for treating a 3D printing-created printed matter according to the present invention. Then, the printed specimen was dried for five minutes at a temperature of 25° C. at a humidity of 50% in the atmosphere. Thereafter, the post curing process was performed for two minutes in the atmosphere using the LuDent Cure system manufactured by 3DMaterials.

For cross-cut testing, a coated surface of the specimen was cut into 100 grid patterns, each with a size of 2 mm×2 mm. Thereafter, a stripping experiment was conducted on the coated surface of the specimen using a tape. Then, the number of grids that remained adhered without falling off the surface was checked.

In all Manufacturing Examples 1 to 6, it was ascertained that all 100 coating grids remained adhered. This result confirmed that the lacquer for treating a 3D printing-created printed matter according to the present invention had excellent adhesion of coating to the surface of the 3D printed matter.

(6) Water Resistance of the Coating on the Surface of the 3D Printed Matter

A specimen for tension testing was printed and output using LuDent OA resin manufactured by 3DMaterials through the LuDent One LCD 3D printer also manufactured by 3DMaterials. The printed specimen was cleaned and rinsed simultaneously using 200 g of the lacquer for treating a 3D printing-created printed matter according to the present invention. Then, the printed specimen was dried at a temperature of 25° C. at a humidity of 50% for five minutes in the atmosphere. Thereafter, the post curing process was performed for two minutes in the atmosphere using the LuDent Cure system manufactured by 3DMaterials.

The specimen that underwent the post curing process was immersed in distilled water maintained at a temperature of 37° C. for 50 hours. Thereafter, through a universal testing machine (UTM), it was ascertained that a tensile strength (2.5% secant modulus) changed.

The transparent orthodontic appliance to be used for dental treatment requires a relatively firm but tough physical property to withstand damage thereto when worn or while in use after wearing. In general, a secant modulus of 1,000 Mpa or greater and a breaking elongation of 50% or more is required of the 3D printing resin that is used for the transparent orthodontic appliance for dental treatment. This physical property requirement is satisfied when the glass transition temperature (Tg) of post-curing resin reaches or falls short of approximately 70° C.

As a result, the resin that has this low glass transition temperature (Tg) absorbs a significant amount of water in a humid environment, such as in the human mouth, and thus, the strength of the resin is significantly reduced. As shown in Table 2, when a specimen that was cleaned and rinsed using a solvent in the related art was immersed in distilled water at a temperature of 37° C. for 50 hours, a tensile strength (2.5% Secant Modulus) changed by −90%. This result ascertained that the specimen could not continuously maintain a strength sufficient for use in the orthodontic appliance.

In contrast, the perfluorinated acrylic resin coated on a surface of a specimen, which was cleaned and rinsed simultaneously using the lacquer for treating a 3D printing-created printed matter according to the present invention, effectively blocked water penetration. Thus, after being immersed in distilled water at a temperature of 37° C. for 50 hours, the specimen maintained 80 to 85% of an initial strength. This result ascertained that the specimen could be used for a sufficiently long time even in a humid environment, such as in the human mouth.

(7) Contamination Resistance of the Coating on the Surface of the 3D Printed Matter A specimen for testing was printed and output using LuDent OA resin manufactured by 3DMaterials through the LuDent One LCD 3D printer also manufactured by 3DMaterials. The printed specimen was cleaned and rinsed simultaneously using 200 g of the lacquer for treating a 3D printing-created printed matter according to the present invention. Then, the printed specimen was dried at a temperature of 25° C. at a humidity of 50% for five minutes in the atmosphere. Thereafter, the post curing process was performed for two minutes in the atmosphere using the LuDent Cure system manufactured by 3DMaterials.

The specimen that underwent the post curing process was immersed in coffee water that resulted from dissolving 20 g of a coffee extract in distilled water maintained at a temperature of 37° C. for 50 hours. Thereafter, the degree to which the specimen was colored was measured.

The measured degree of coloration (or discoloration) of the specimen was compared with the degree of coloration (or discoloration) of a commercially-available transparent orthodontic appliance that was manufactured through vacuum molding of a PET sheet under the same conditions. The result of the comparison ascertained that discoloration did not occur.

In contrast, the printed specimen was cleaned and rinsed, simply using a general solvent in the related art and was dried. The result ascertained that a surface of the specimen cured after drying exhibited a brown color.

The above-described experiments ascertained that the specimen, which was cleaned and rinsed simultaneously using the lacquer for treating a 3D printing-created printed matter according to the present invention, was blocked from coloration due to the influence of the perfluorinated acrylic resin coated on the surface of the specimen and that the contamination resistance of the specimen was improved.

As discussed above, during processes of cleaning and rinsing the 3D printed matter, the lacquer for treating a 3D printing-created printed matter according to the present invention cleans uncured resin remaining on the surface of the 3D printed matter and at the same time coats the perfluorinated acrylic resin, as a protective film, on the surface of the 3D printed matter. Thus, the lacquer for treating a 3D printing-created printed matter keeps the surface of the 3D printed matter, which is to be manufactured, transparent and, as the same time, fundamentally blocking oxygen or moisture from penetrating the surface of the 3D printed matter during the post curing process. As a result, the lacquer for treating a 3D printing-created printed matter supports the post curing process in a facilitated manner under a general atmospheric environment without requiring a separate special operating environment.

In addition, the lacquer for treating a 3D printing-created printed matter provides high surface hardness and excellent water resistance and contamination resistance to the 3D printed matter that are achieved through various preferred physical properties of the perfluorinated acrylic resin coated on the surface of the 3D printed matter. Particularly, the lacquer for treating a 3D printing-created printed matter has properties optimized specifically for application to the transparent orthodontic appliance that are used particularly for dental treatment.

Moreover, in the case of using the lacquer for treating a 3D printing-created printed matter according to the present invention, the 3D printed matter can be cleaned and rinsed simultaneously during one process. Thus, the advantage of simplifying an overall printing process can be achieved.

The preferred embodiments of the present invention are described above in an exemplary manner through several of the representative implementation examples.

However, the present invention is not limited thereto. The scope of the present invention is defined by the following claims. In addition, it is apparent to a person of ordinary skill in the art to which the present invention pertains that various modifications and alterations may be made to the embodiments without departing from the nature and gist of the present invention that is defined in the claims. These modifications and alterations fall within the scope of the present invention as long as their scopes are obvious to a person of ordinary skill in the art to which the present invention pertains.

The invention claimed is:

1. A lacquer for treating a 3D printing-created printed matter, the lacquer being used to clean and rinse a surface of a 3D matter that is printed through a photocuring-type 3D printer, the lacquer comprising:
a perfluorinated acrylic resin having a structure expressed in the following [Chemical Formula 1]:

[Chemical Formula 1]

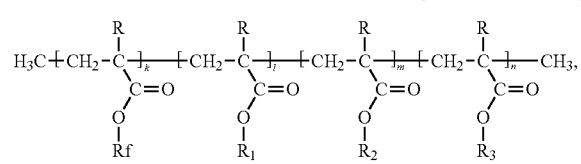

where k, l, m, and n are constants, k has a value ranging from 1 to 10,000, and l, m, and n each have a value ranging from 0 to 10,000, (except when l, m, and n all have a value of 0), where R is —H, —CH$_3$, or a hydrocarbon group that has a carbon number of 20 or less, where R$_f$ is a perfluorinated carbon group, containing a perfluorinated carbon (—CF$_2$— or —CF$_3$), that has a carbon number ranging from 3 to 12, and where R$_1$, R$_2$, and R$_3$ are hydrocarbon groups, each with a hydrogen or carbon number ranging from 1 to 20, and have structures, in each of which one or more carbon molecules are substituted by oxygen (O), nitrogen (N), or sulfur (S);

a perfluorinated solvent; and a general solvent that does not contain fluoride.

2. The lacquer of claim 1, wherein the R$_f$ is one of Pentafluorobenzyl [—CH$_2$-cyclo(C$_6$F$_5$)], Octafluoropentyl [—CH$_2$(CF$_2$)$_4$H], Nonafluorohexyl [—CH$_2$CH$_2$(CF$_2$)$_3$CF$_3$], Heptafluorobutyl [—CH$_2$CF$_2$CF$_2$CF$_3$], Tridecafluoro-n-octyl [—CH$_2$CH$_2$(CF$_2$)$_5$CF$_3$], 2-Perfluorooctyl ethyl [—CH$_2$CH$_2$(CF$_2$)$_7$CF$_3$], 2-Perfluorodecyl ethyl [—CH$_2$CH$_2$(CF$_2$)$_9$CF$_3$], 3-(Perfluorobutyl)propyl [—CH$_2$(CH$_2$)$_2$(CF$_2$)$_3$CF$_3$], 3-(Perfluorobutyl)propyl [—CH$_2$(CH$_2$)$_2$(CF$_2$)$_5$CF$_3$], 3-Perfluorooctyl propyl [—CH$_2$(CH$_2$)$_2$(CF$_2$)$_7$CF$_3$], Trifluoroethyl [—CH$_2$CF$_3$], Pentafluorophenyl [-cyclo(C$_6$F$_5$)], Tetrafluoropropyl [—CH$_2$CF$_2$CF$_2$H], Hexafluorobutyl [—CH$_2$CF$_2$CHFCF$_3$], Pentafluoropropyl [—CH$_2$CF$_2$CF$_3$], Hexafluoroisopropyl [—C(CF$_3$)$_2$H], and Dodecafluoroheptyl [—CH$_2$(CF$_2$)$_5$CHF$_2$].

3. The lacquer of claim 1, wherein each of the R$_1$, R$_2$, and R$_3$ reactant groups has a linear structure, a branched structure, a cyclo structure, or an acyclic structure.

4. The lacquer of claim 1, wherein each of the R$_1$, R$_2$, and R$_3$ reactant groups is one of Hydrogen [—H], Methyl [—CH$_3$], Ethyl [—CH$_2$CH$_3$], isopropyl (—CH(CH$_3$)$_2$), n—butyl [—(n)C$_4$H$_9$], Ethylhexyl [—CH$_2$CH(C$_2$H$_5$)C$_4$H$_9$], n-Hexyl [—(n)C$_6$H$_{13}$], lauryl [—C$_{12}$H$_{25}$], Hydroxyethyl [—CH$_2$CH$_2$—OH], Hydroxypropyl [—CH$_2$CH(OH)CH$_3$], Cyclic trimethylolpropane, phenoxy benzyl, trimethyl cyclohexyl, isobornyl, o—phenylphenol EO, Tert—butylcyclohexyl, Benzyl, Biphenylmethyl, Phenol EO, Phenol (EO)$_2$, Phenol (EO)$_4$, Tetrahydrofuryl, Nonyl phenol (EO)$_2$, Nonyl phenol (EO)$_4$, Nonyl phenol (EO)$_8$, and Stearyl.

5. The lacquer of claim 1, wherein the perfluorinated solvent has a structure of the following [chemical formula 2], in which one or more —CH$_2$— molecules are substituted by oxygen (O) or nitrogen (N):

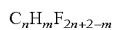
$C_nH_mF_{2n+2-m}$      [Chemical Formula 2]

where n is an integer ranging from 3 to 20, and m is an integer that is 1 or greater.

6. The lacquer of claim 1, wherein the perfluorinated solvent has a structure expressed in the following [chemical formula 3]:

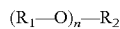
$(R_1—O)_n—R_2$      [Chemical Formula 3]

where n is an integer ranging from 1 to 3, one of R$_1$ and R$_2$ contains one or more fluorine atoms, R$_1$ and R$_2$ are carbon compounds, each having a linear structure, a branched structure, a cyclo structure, or an acyclic structure, and R$_1$ or R$_2$ is a structure containing one or more nitrogen or oxygen atoms.

7. The lacquer of claim 1, wherein the perfluorinated solvent has a structure expressed in the following [chemical formula 4]:

$R_f—O—R$      [Chemical Formula 4]

where R$_f$ and R are carbon compounds, each with a linear structure, a branched structure, a cyclic structure, or an acyclic structure, R$_f$ has a structure that contains at least one fluorine atom, and R has a structure that contains no fluorine.

8. The lacquer of claim 7, wherein the perfluorinated solvent has one structure, among n-C$_3$F$_7$OCH$_3$, (CF$_3$)$_2$CFOCH$_3$, n-C$_4$F$_9$OCH$_3$, (CF$_3$)$_2$CFCF$_2$OCH$_3$, n-C$_3$FOC$_2$H$_5$, n-C$_4$FOC$_2$H$_5$, (CF$_3$)$_2$CFCF$_2$OCH$_5$, (CF$_3$)$_3$COCH$_3$, and (CF$_3$)$_3$COC$_2$H$_5$.

9. The lacquer of claim 1, wherein the perfluorinated solvent has a structure expressed in the following [chemical formula 5]:

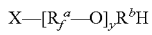
$X—[R_f^a—O]_y R^b H$      [Chemical Formula 5]

where X is a perfluoroalkyl that has fluorine and hydrocarbon with a hydrogen or carbon number ranging from 1 to 3, R$_f^a$ is —CF$_2$—, C$_2$F$_4$—, or C$_3$F$_6$—, y is an integer ranging from 1 to 7, and R$^b$ is hydrocarbon with a carbon number ranging from 1 to 3.

10. The lacquer of claim 9, wherein the perfluorinated solvent has one structure, among C$_4$F$_9$OC$_2$F$_4$H, C$_6$F$_{13}$OCFH, HC$_3$F$_6$OC$_3$F$_6$H, C$_3$F—OCH$_2$F, HCFOCF$_2$OCF$_2$H, HCF$_2$OCF$_2$CF$_2$OCF$_2$H, HC$_3$F$_6$OCH$_3$, and HCF$_2$OCF$_{20}$C$_2$F$_4$OCF$_2$H.

11. The lacquer of claim 1, wherein the perfluorinated solvent has a structure expressed in the following [chemical formula 6]:

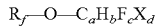
$R_f—O—C_aH_bF_cX_d$      [Chemical Formula 6]

where R$_f$ is a perfluoroalkyl that has a carbon number ranging from 3 to 6 and selectively one oxygen (O) or nitrogen (N) atom, a is an integer ranging from 1 to 6, b is an integer greater than or equal to 1, c is an integer ranging from 0 to 2, and d is an integer greater than or equal to 1 and where b+c+d=2a+1, and X is one of bromine, iodine, and chlorine.

12. The lacquer of claim 1, wherein the general solvent that does not contain the fluoride is an alcohol or an aliphatic saturated hydrocarbon.

13. The lacquer of claim 1, wherein the general solvent that does not contain the fluoride is ethanol, isopropanol (IPA), ethyl acetate, or isoparaffin.

14. The lacquer of claim 1, wherein the solvent that is to be contained in the lacquer is prepared by mixing a perfluorinated solvent of 60 to 95 wt % and a general solvent of 5 to 40 wt %.

15. The lacquer of claim 1, wherein the perfluorinated acrylic resin that is to be contained in the lacquer accounts for 20 to 40 wt % of an entire weight of the lacquer.

16. The lacquer of claim 1, the lacquer being used to clean and rinse an orthodontic appliance for dental treatment that is printed through the photocuring-type 3D printer.

* * * * *